Patented Sept. 23, 1947

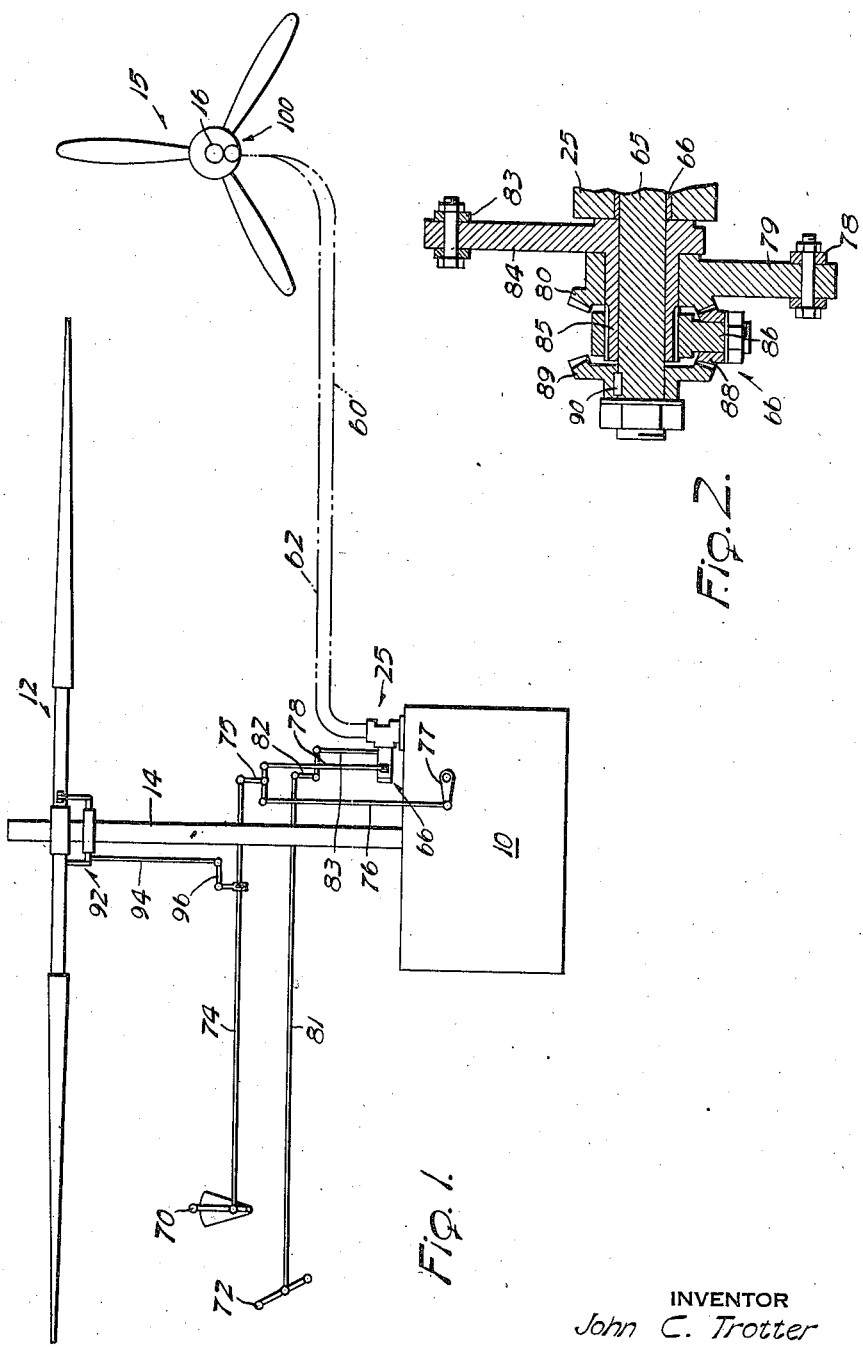

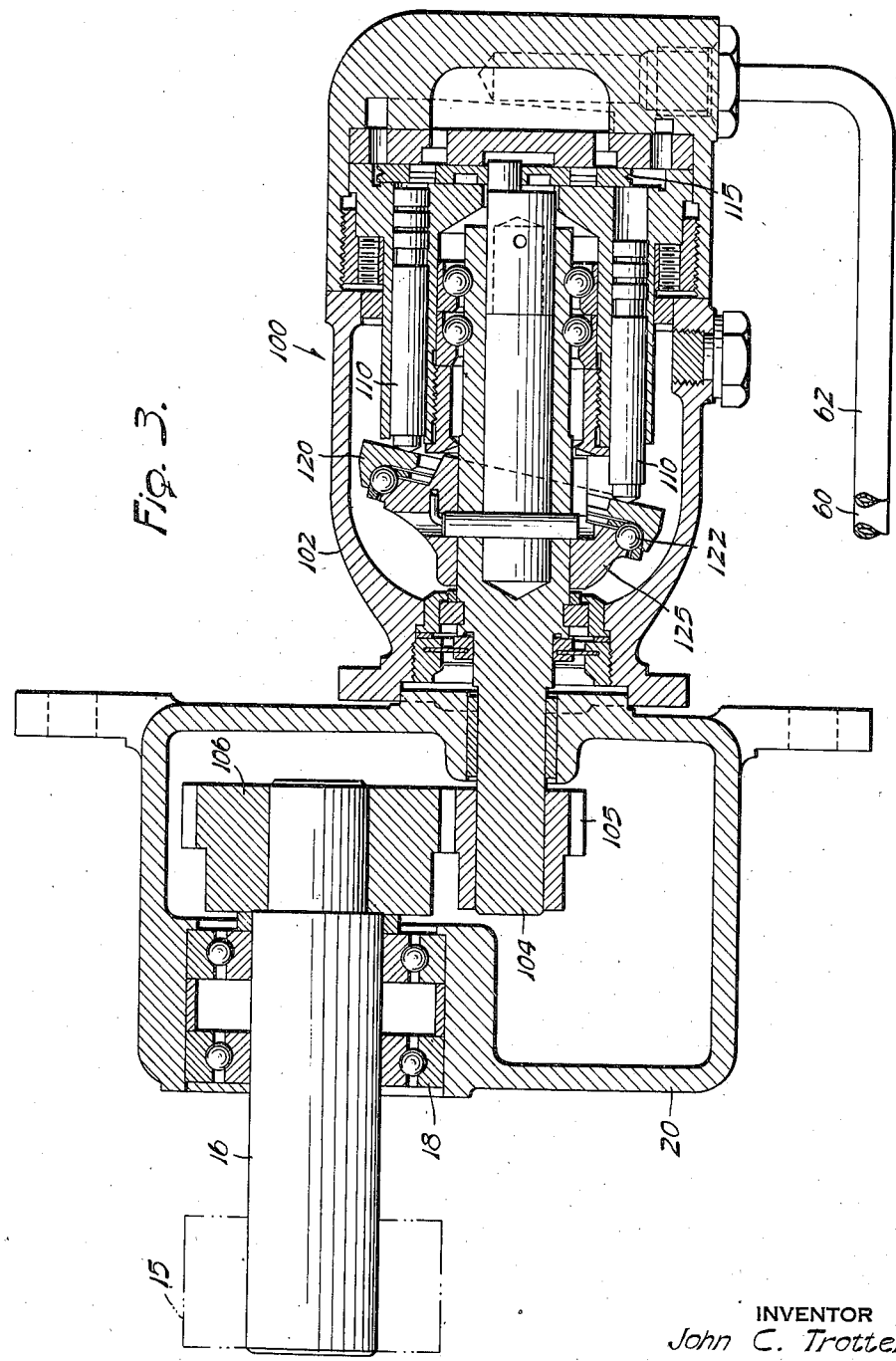

2,427,982

UNITED STATES PATENT OFFICE 2,427,982

HELICOPTER ANTITORQUE AND STEERING CONTROL

John C. Trotter, South Burlington, Vt., assignor to Bell Aircraft Corporation, Wheatfield, N. Y.

Application June 19, 1947, Serial No. 755,602

7 Claims. (Cl. 244—17)

This invention relates to helicopter aircraft, and more particularly to flight control means therefor; and this application is a continuation-in-part of my co-pending application Serial No. 542,637, filed June 29, 1944.

It is presently known to be desirable to provide helicopter aircraft with lift rotor blade pitch change means and rotor-torque countering or directional control devices such as a laterally directed propeller at the tail of the fuselage. It is desirable to arrange the controls for the thrust output of the laterally directed propeller and the lift rotor blade pitch change device and the engine throttle so as to cause the counter-torque effects of the directional control device to be automatically adjusted approximately to match variations of the rotor torque reactions. I have determined that the use of mechanical linkage means for such purposes invariably introduces mechanical complications and instabilizing lost motion and vibration producing effects. Also, such arrangements are inadequate to provide optimum directional control and stabilizing effects for utmost ease and facility of helicopter aircraft operation; and it is a primary object of the present invention to provide improved means for controlling the counter-torque airscrew and lift rotor control mechanisms in helicopter aircraft or the like whereby to provide improved performance and to eliminate difficulties and disadvantages of prior helicopter control arrangements.

Another object of the invention is to provide an automatic control system for the purpose referred to which is extremely light-weight; highly efficient in operation; simple to install and service; highly responsive to pilot-applied control actions; and which enables mechanical simplification of the entire aircraft to be accomplished because of elimination of the need of certain accessories such as starting clutch devices or the like. Other objects and advantages of the invention will appear from the specification hereinafter.

In the drawings:

Fig. 1 is a diagrammatic illustration of a helicopter power and control arrangement of the invention;

Fig. 2 is a vertical sectional view, on an enlarged scale, through a control mechanism for the pump supplying driving power to the tail propeller; and Fig. 3 is a vertical section through the tail propeller power supply motor thereof.

The invention is illustrated in the drawing as applied to a helicopter aircraft having the usual type primary power supply engine 10 and a lift rotor 12. The lift rotor is shown mounted by means of a vertical shaft 14 into driving connection with the engine 10. A tail propeller 15 is indicated in Figs. 1–3 as being mounted upon the aircraft fuselage by means of a shaft 16 carried by bearings 18 upon a housing structure 20 which bolts upon the aircraft fuselage in such manner as to mount the propeller 15 to be directed laterally of the aircraft fuselage. Thus, rotation of the propeller 15 will provide thrust forces in directions laterally of the aircraft fore-and-aft center line, such as will counter the torque reaction forces of the lift rotor 12 which tend to drive the aircraft fuselage to rotate about the axis of the rotor shaft 14 oppositely to the direction of rotor rotation.

To supply power to the tail propeller 15 I provide a hydraulic pressure supply pump device as indicated generally at 25 to be driven by means of a mechanical connection to the engine 10. The pump 25 may be of any suitable variable displacement closed-circuit type, and by way of example the pump may be of the kind described and shown in detail in U. S. Patent No. 2,190,812.

Conduits 60—62 lead from the inlet and outlet ports of the pump 25 to provide a return-circuit fluid system leading from the pump 25 to the motor for driving the tail propeller 15, which motor will be described in detail hereinafter.

The power output of the pump 25 will of course vary with the engine speed, but to provide for further control of the pump independently of the speed thereof it is arranged to vary the rate of fluid displacement thereof by rotating a control shaft of the pump; the control shaft being furnished in a form such as the shaft 103 as shown in U. S. Patent No. 2,190,812. In applicant's drawing (Fig. 2) the pump control stem is indicated at 65 and is mounted by means of a bearing 66 to extend from the pump housing 25. As is shown in Figs. 1–2 the control stem 65 is arranged to be controlled by a differential device 66 connected to the engine throttle lever 70 and to the aircraft directional control device 72. As shown in Fig. 1 the connections to the throttle comprise a push-pull member 74; a bell crank device 75; and a link 76, whereby the throttle control lever 70 is connected to the engine throttle arm 77. The crank 75 also connects through a link 78 to an arm 79 which extends from one ring gear 80 of the differential; while the directional control lever 72 is coupled through a link 81; a bell crank 82; and a link 83 to an arm 84 which extends from a sleeve 85 carried rotatably on the shaft 65. The sleeve mounts a pin 86 which carries the planetary gear 88 of the differential. The other ring gear 89 of the differential is keyed to the shaft 65 as indicated at 90.

The lift rotor pitch mechanism is indicated at 92 in Fig. 1, and is connected through link 94 and bell crank 96 to the throttle control rod 74. As illustrated in Figs. 1 and 3, the power supply motor for the tail propeller 15 is indicated generally at 100. The control mechanism will be preferably so arranged that every pilot actuation of the lever 70 will produce an adjustment of the rotor pitch change mechanism and a simultaneous adjustment of the throttle so as to regulate the engine fuel supply in such manner that the rotor-engine unit will always operate at a substantially constant speed of revolution. Consequently, under increased pitch and correspondingly opened throttle conditions, the rotor will develop substantially greater torque than when operating under reduced pitch and reduced throttle conditions, although the engine speed will be substantially constant throughout the range of rotor torque reaction variances. Since the tail propeller 15 is powered by the hydraulic pump-motor unit 25—100, of which the pump member is directly coupled to the engine 10, the thrust output of the propeller 15 will be constant except as the pump control stem 65 is adjusted by operation of the differential device 66 which is in turn controlled by the pilot levers 70—72.

For example, whenever the pilot lever 70 is adjusted to change the lift rotor blade pitch angle (for vertical flight control purposes) the engine throttle will be automatically adjusted simultaneously therewith to maintain substantially constant rotor-engine speed under all normal operating conditions, while the output of the pump 25 will be automatically adjusted by rotation of the gear 80 of the differential mechanism which in turn causes the pump control shaft 65 to be rotated. The differential and control devices are arranged so as to change the tail propeller speed of rotation and the resultant thrust thereof in such manner as to substantially balance changes in the lift rotor torque reaction. However, the pilot may at any time override the automatic control influences affecting the tail propeller thrust output by adjusting the lever 72. Therefore, although the automatic control differential mechanism is designed to provide accurately balancing control effects in respect to every pilot adjustment of the single control lever 70, the lever 72 may be pilot-manipulated at any time in order to provide for minor corrections in the directional control effects as well as for changing the flight course.

The tail propeller motor 100 is illustrated to include a housing 102 rotatably supporting a drive shaft 104. The shaft 104 carries a pinion 105 which meshes with a gear 106 carried by the propeller shaft 16, whereby rotation of the motor shaft 104 will drive the tail propeller 15. The motor device 100 may comprise, generally speaking, a device similar to the pump 25 which is adapted for reverse operation; that is, to be driven in response to circulation of pressured fluid thereinto from the conduits 60—62. For example, the motor 100 may comprise a plurality of pistons 110 arranged to be driven in sequence to reciprocate in such manner as to cause a wobble plate device 120 to oscillate so as to drive through means of a bearing 122 a cam faced knob portion 125 of the shaft 104, whereby the shaft 104 is caused to rotate in accord with the displacement adjustment of the pump device 25.

Thus, it will be appreciated that the constantly pressured fluid power transmission control arrangement of the invention provides means whereby no lost motion effects can exist in the control system, and wherein all of the mechanical operations of the mechanism are confined within a pair of relatively small and compact precision units; that is, the pump 25 and the motor 100. These units are disposed respectively in direct connection with the primary engine 10 and the propeller 15, and are interconnected simply by means of closed conduits 60—62. Hence, the usual mechanically complicated and cumbersome and otherwise undesirable torque shaft, bevel gear boxes, drive chains, or the like, which have heretofore been necessarily employed to extend between the engine and the driven propeller are eliminated. It will also be appreciated that the power transmission and control arrangement of the invention effects substantial savings in weight; is easy to install and service; provides improved responsiveness to control motions; and eliminates the need for starting clutches or the like.

Although only one form of the invention has been shown and described in detail it will be apparent to those skilled in the art that the invention is not so limited but that various changes may be made therein without departing from the spirit of the invention or the scope of the appended claims.

What is claimed is:

1. In a helicopter aircraft, in combination, a lift rotor, a power supply engine driving said lift rotor, a power output control for said engine, a directional control propeller carried by said aircraft and directed laterally thereof to provide thrust forces countering the torque reaction forces transmitted to the aircraft from the lift rotor, and a hydraulic power supply system for said propeller comprising a pump device driven by said engine and adapted to circulate pressured fluid through a closed circuit conduit system, said conduit system having a motor device in series therewith coupled to said propeller and adapted to operate in response to flow of pressured fluid through said conduit system to drive said propeller, a fluid displacement control valve for said pump device, and a differential gear interconnecting said engine power output control and said fluid displacement control valve.

2. In a helicopter aircraft, in combination, a lift rotor, a power supply engine driving said lift rotor, an engine throttle control device, a directional control propeller carried by said aircraft and directed laterally thereof to provide thrust forces countering the torque reaction forces transmitted to the aircraft from the lift rotor, a hydraulic power supply system for said propeller comprising a variable displacement pump driven by said engine and adapted to circulate pressured fluid through a closed circuit conduit system, said conduit system having a motor in series therewith and coupled to said propeller for driving the latter in response to flow of pressured fluid through said conduit system, a pump displacement control member, a differential gear device having its driven element connected to said pump control member for adjusting the latter, said engine throttle being coupled to one driving element of said gear, and a pilot-operable directional control member coupled to the other driving element of said gear.

3. In a helicopter aircraft, in combination, a lift rotor, a power supply engine driving said lift rotor, a power output control for said engine, a directional control propeller carried by said aircraft and directed laterally thereof to provide thrust forces countering the torque reaction forces transmitted to the aircraft from the lift rotor, a hydraulic power supply system for said propeller comprising a pump driven by said engine and adapted to circulate pressured fluid through a closed circuit conduit system, said conduit system having a motor in series therewith coupled to said propeller and adapted to operate in response to flow of pressured fluid through said conduit system to drive said propeller, a pump displacement control member, a differential gear having its driven element connected to said pump displacement control member and its driving elements connected respectively to said engine control and to a pilot-operable aircraft directional control member.

4. In an aircraft, in combination, a first rotor, an engine driving said rotor, an engine throttle control device, a second rotor carried by said aircraft and directed to provide thrust forces countering the torque reaction forces transmitted to the aircraft from said first rotor, a power supply system for said propeller comprising a constantly pressured variable displacement pump driven by said engine, a closed circuit fluid conduit system having a fluid pressure motor in series therewith and coupled to said second rotor for driving the latter in response to flow of pressure fluid through said conduit system, a pump displacement rate control member, a differential device having its driven element connected to said pump control member for adjusting the latter, said engine throttle control being coupled to one driving element of said differential, and a pilot-operable directional control member coupled to the other driving element of said differential.

5. In a helicopter aircraft, in combination, a lift rotor, an engine driving said lift rotor, a lift rotor thrust control device, a directional control propeller carried by said aircraft and directed laterally thereof to provide thrust forces countering the torque reaction forces transmitted to the aircraft from the lift rotor, a hydraulic power supply system for controlling the thrust of said propeller comprising a variable displacement pump driven by said engine and adapted to circulate pressured fluid through a closed circuit conduit system, said conduit system having a motor in series therewith and coupled to said propeller for controlling the thrust of the latter in response to flow of pressured fluid through said conduit system, a pump displacement control member, a differential device having its driven element connected to said pump control member for adjusting the latter, said lift rotor thrust control device being coupled to a driving element of said differential, and a pilot-operable directional control member coupled to the other driving element of said differential.

6. In a helicopter aircraft, in combination, a lift rotor, an engine driving said lift rotor, a lift rotor blade pitch change device, a directional control propeller carried by said aircraft and directed laterally thereof to provide thrust forces countering the torque reaction forces transmitted to the aircraft from the lift rotor, a hydraulic power supply system for said propeller comprising a pump driven by said engine and adapted to circulate pressured fluid through a closed circuit conduit system, said conduit system having a motor in series therewith coupled to said propeller and adapted to operate in response to flow of pressured fluid through said conduit system to control the thrust of said propeller, a pump displacement control member, a differential having its driven element connected to said pump displacement control member and its driving elements connected respectively to said lift rotor blade pitch change device and to a pilot-operable aircraft directional control member.

7. In a helicopter aircraft, in combination, a lift rotor, an engine driving said lift rotor, a power output control for said engine, a pilot-operable lift rotor blade pitch change device, a directional control propeller carried by said aircraft and directed laterally thereof to provide thrust forces countering the torque reaction forces transmitted to the aircraft from the lift rotor, a hydraulic power supply system for said propeller comprising a pump driven by said engine and adapted to circulate pressured fluid through a closed circuit conduit system, said conduit system having a motor in series therewith coupled to said propeller and adapted to operate in response to flow of pressured fluid through said conduit system to control the thrust of said propeller, a pump displacement control member, a differential having its driven element connected to said pump displacement control member and one of its driving elements connected to a pilot-operable aircraft directional control member and the other of its driving elements connected for selective actuation thereby to said engine power control and said lift rotor blade pitch change device.

JOHN C. TROTTER.

REFERENCES CITED

The following references are of record in the file of this patent:

UNITED STATES PATENTS

| Number | Name | Date |
|---|---|---|
| 1,472,148 | Berliner | Oct. 30, 1923 |
| 2,318,259 | Sikorsky | May 4, 1943 |
| 1,980,999 | Larsen | Nov. 20, 1934 |
| 2,190,812 | Wahlmark | Feb. 20, 1940 |
| 1,971,734 | Stalker | Aug. 28, 1934 |
| 2,317,340 | Bennett | Apr. 27, 1943 |